United States Patent
Lee et al.

(10) Patent No.: US 10,267,526 B2
(45) Date of Patent: Apr. 23, 2019

(54) POWER CONVERSION APPARATUS AND AIR CONDITIONER INCLUDING THE SAME

(71) Applicant: LG ELECTRONICS INC., Seoul (KR)

(72) Inventors: Jongwan Lee, Seoul (KR); Eungho Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 344 days.

(21) Appl. No.: 15/231,826

(22) Filed: Aug. 9, 2016

(65) Prior Publication Data

US 2017/0045249 A1    Feb. 16, 2017

(30) Foreign Application Priority Data

Aug. 10, 2015 (KR) .................. 10-2015-0112632

(51) Int. Cl.
*H02M 5/40* (2006.01)
*H02M 3/335* (2006.01)
(Continued)

(52) U.S. Cl.
CPC ............ *F24F 1/08* (2013.01); *F24F 11/30* (2018.01); *F24F 11/62* (2018.01); *H02K 11/33* (2016.01); *H02M 3/335* (2013.01); *H02M 3/33561* (2013.01); *H02M 7/04* (2013.01); *H02P 27/06* (2013.01); *F24F 11/46* (2018.01); *F24F 11/56* (2018.01); *F24F 11/64* (2018.01);
(Continued)

(58) Field of Classification Search
CPC ... H02M 2001/0067; H02M 2001/008; H02M 2001/009; H02M 3/335; H02M 3/3353; H02M 5/40; H02M 5/45; H02M 5/458; H02M 7/02; H02M 7/06; H02M 7/521
See application file for complete search history.

(56) References Cited

U.S. PATENT DOCUMENTS 7,123,488 B2 * 10/2006 Hirabayashi ............ H02M 1/10
363/19
2009/0228147 A1    9/2009 Lim et al.
(Continued)

FOREIGN PATENT DOCUMENTS

CN    1551483    12/2004
CN    101248314    8/2008
(Continued)

OTHER PUBLICATIONS

Chinese Office Action dated Apr. 28, 2018 issued in Application 201610651968.X (Full Chinese text and English Abstract).
(Continued)

*Primary Examiner* — Gary L Laxton
(74) *Attorney, Agent, or Firm* — KED & Associates LLP

(57) ABSTRACT

A power conversion apparatus (and an air conditioner including the same) may include a rectifier to rectify a voltage of an input alternating current (AC) power source and a voltage drop device to output a dropped voltage using the voltage from the rectifier. The voltage drop device may include a transformer and a communication voltage output device provided at a secondary side of the transformer to output a direct current (DC) voltage for operation of a communication device. Accordingly, a voltage may be stably supplied to the communication device while reducing standby power.

17 Claims, 9 Drawing Sheets

(51) Int. Cl.
 *F24F 1/08* (2011.01)
 *H02M 7/04* (2006.01)
 *H02K 11/33* (2016.01)
 *H02P 27/06* (2006.01)
 *F24F 11/30* (2018.01)
 *F24F 11/62* (2018.01)
 *H02M 1/12* (2006.01)
 *H02M 1/00* (2006.01)
 *F24F 11/64* (2018.01)
 *F24F 11/56* (2018.01)
 *F24F 11/46* (2018.01)
 *F24F 11/85* (2018.01)

(52) U.S. Cl.
 CPC ............... *F24F 11/85* (2018.01); *H02M 1/12* (2013.01); *H02M 2001/0032* (2013.01); *Y02B 70/16* (2013.01)

(56) References Cited

U.S. PATENT DOCUMENTS

2009/0251925 A1 10/2009 Usui et al.
2011/0194947 A1 8/2011 Hong et al.

FOREIGN PATENT DOCUMENTS

| | | |
|---|---|---|
| CN | 102148602 | 8/2011 |
| EP | 2 800 263 | 11/2014 |
| WO | WO 2006/061924 | 6/2006 |

OTHER PUBLICATIONS

Extended European Search Report issued in Application 16183406.4 dated Jan. 20, 2017.

* cited by examiner

US 10,267,526 B2

POWER CONVERSION APPARATUS AND AIR CONDITIONER INCLUDING THE SAME

CROSS-REFERENCE TO RELATED APPLICATION

This application claims priority under 35 U.S.C. § 119 from Korean Application No. 10-2015-0112632, filed Aug. 10, 2015, the subject matter of which is hereby incorporated by reference.

BACKGROUND

1. Field

Embodiments may relate to a power conversion apparatus and an air conditioner including the same. More particularly, embodiments may relate to a power conversion apparatus capable of stably supplying a voltage to a communication unit while reducing standby power, and an air conditioner including the same.

2. Background

An air conditioner may discharge cool or hot air into a room to adjust an indoor temperature and to purify indoor air, thereby providing a comfortable indoor environment to users. The air conditioner may include an indoor unit installed in a room and an outdoor unit for supplying a refrigerant to the indoor unit. The indoor unit may include an indoor heat exchanger. The outdoor unit may include a compressor and an outdoor heat exchanger.

A communication unit may be provided for communication between the indoor unit and the outdoor unit. Even when the air conditioner does not operate, a voltage is supplied to the communication unit, thereby consuming standby power.

BRIEF DESCRIPTION OF THE DRAWINGS

Arrangements and embodiments may be described in detail with reference to the following drawings in which like reference numerals refer to like elements and wherein.

DETAILED DESCRIPTION

Reference may now be made in detail to preferred embodiments, examples of which are illustrated in the accompanying drawings.

The suffixes "module" and "unit" in elements used in the description below are given only in consideration of ease in preparation of the specification and do not have specific meanings or functions. Therefore, the suffixes "module" and "unit" may be used interchangeably.

Figure 1:
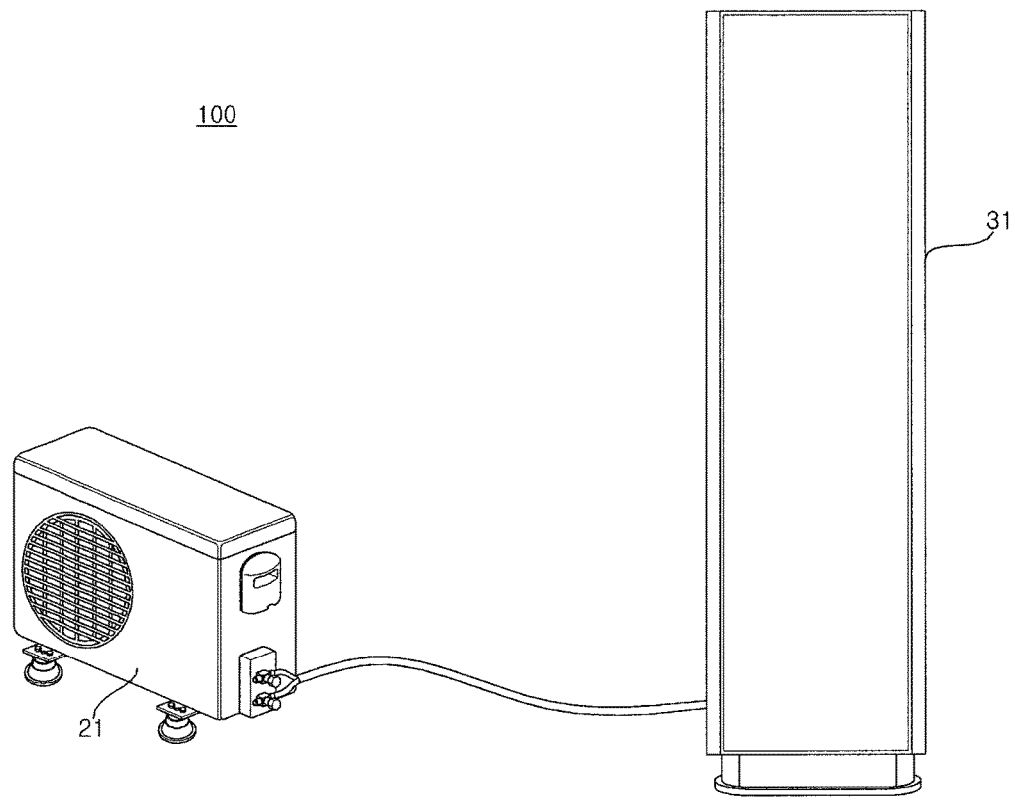
FIG. 1 is a diagram showing an air conditioner according to an example embodiment.

FIG. 1 is a view illustrating an air conditioner according to an example embodiment. Other embodiments and configurations may also be provided.

As shown in FIG. 1, an air conditioner 100 may include an indoor unit 31 and an outdoor unit 21 connected to the indoor unit 31.

The indoor unit 31 of the air conditioner may be any one of a stand type, a wall mount type, and a ceiling type air conditioners. In FIG. 1, the stand type indoor unit 31 is shown.

The air conditioner 100 may further include one of a ventilator, an air purifier, a humidifier, and/or a heater, which may be operatively connected to the indoor unit and the outdoor unit.

The outdoor unit 21 may include a compressor for compressing a refrigerant, an outdoor heat exchanger for performing heat exchange between the refrigerant and outdoor air, an accumulator for extracting a gaseous refrigerant component from the refrigerant and supplying the extracted gaseous refrigerant component to the compressor, and a four-way valve for changing a flow path of the refrigerant based on a heating operation. While the outdoor unit 21 may include a plurality of sensors, a valve, and an oil collector, descriptions thereof may be omitted herein.

The outdoor unit 21 may operate compressors and outdoor heat exchangers included therein to compress the refrigerant or perform heat exchange based on setting conditions and to supply the compressed or heat-exchanged refrigerant to the indoor unit 31. The outdoor unit 21 may be driven according to a demand of a remote control unit and/or the indoor unit 31. As a cooling/heating capacity of the air conditioner 100 varies based on the indoor unit which is driven, a number of driven outdoor units and a number of driven compressors installed in outdoor units may change.

The outdoor unit 21 may supply the compressed refrigerant to the connected indoor unit 31.

The indoor unit 31 may receive the refrigerant from the outdoor unit 21 to discharge cool or hot air into a room. The indoor unit 31 may include an indoor heat exchanger, an indoor fan, an expansion valve for expanding the refrigerant, and a plurality of sensors.

The outdoor unit 21 and the indoor unit 31 are connected to each other via communication cables to exchange data with each other. The outdoor unit 21 and the indoor unit 31 are connected to the remote control unit by wire or wirelessly to operate under control of the remote control unit.

A remote controller may connect to the indoor unit 31 to allow a user to input a control command for controlling the indoor unit and to receive and display state information on the indoor unit. The remote controller may communicate with the indoor unit in a wired or wireless manner based on how the remote controller is connected to the indoor unit 31.

Figure 2:
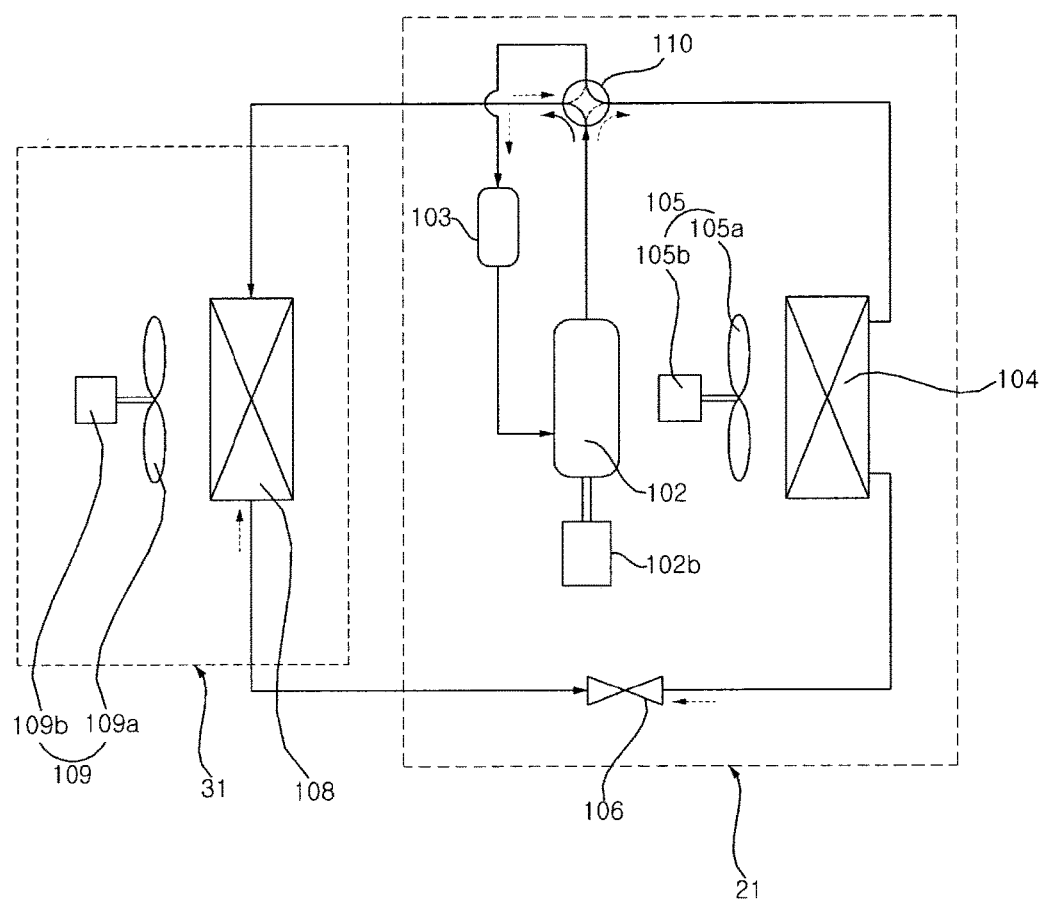
FIG. 2 is a schematic view showing the outdoor unit and the indoor unit of FIG. 1.

FIG. 2 is a schematic view of the outdoor unit and the indoor unit shown in FIG. 1. Other embodiments and configurations may also be provided.

Referring to FIG. 2, the air conditioner 100 may be broadly divided into the indoor unit 31 and the outdoor unit 21.

The outdoor unit 21 may include a compressor 102 for compressing a refrigerant, a compressor motor 102b for driving the compressor, an outdoor heat exchanger 104 for dissipating heat from the compressed refrigerant, an outdoor blower 105 including an outdoor fan 105a disposed at one side of the outdoor heat exchanger 104 to accelerate heat dissipation of the refrigerant and a motor 105*b* for rotating the outdoor fan 105*a*, an expansion unit 106 for expanding the condensed refrigerant, a cooling/heating switching valve 110 for changing a flow path of the compressed refrigerant, and an accumulator 103 for temporarily storing the gaseous refrigerant to remove moisture and foreign particles from the refrigerant and supplying the refrigerant of predetermined pressure to the compressor.

The indoor unit 31 may include an indoor heat exchanger 108 disposed in a room to perform a cooling/heating function, and an indoor blower 109. The indoor blower 109 may include an indoor fan 109*a* disposed at one side of the indoor heat exchanger 108 to accelerate heat dissipation of the refrigerant, and an indoor fan motor 109*b* for rotating the indoor fan 109*a*.

At least one indoor heat exchanger 108 may be provided. At least one of an inverter compressor and a constant speed compressor may be used as the compressor 102.

The air conditioner 100 may be configured as a cooler for cooling the room or may be configured as a heat pump for cooling or heating the room.

The compressor 102 of the outdoor unit 21 (FIG. 1) may be driven by a power conversion apparatus 200 (FIG. 4) for driving a compressor motor 250.

Figure 3:
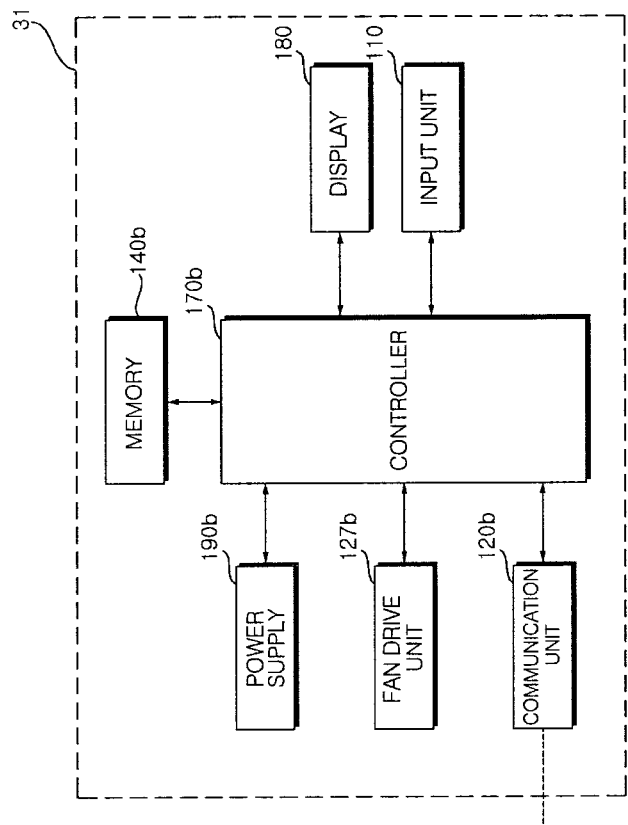
FIG. 3 is a block diagram of the outdoor unit and the indoor unit of FIG. 1.
Figure 3:
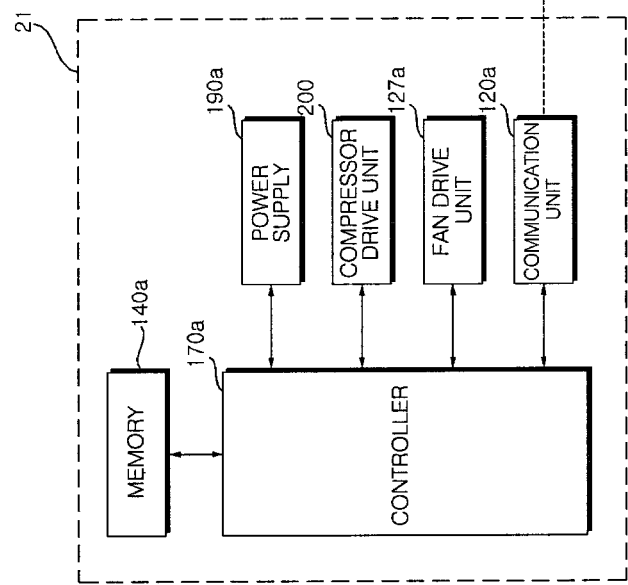

FIG. 3 is a block diagram of the outdoor unit and the indoor unit of FIG. 1. Other embodiments and configurations may also be provided.

The indoor unit 21 may include a communication unit 120*a* (or communication device), a memory 140*a*, a controller 170*a*, a power supply 190*a*, a compressor drive unit 200 and a fan drive unit 127*a* (or fan device).

The communication unit 120*a* may exchange data with the indoor unit 31. For example, the communication unit 120*a* may exchange data with the indoor unit via wired power-line communication.

The memory 140*a* may store a variety of data for operation of the outdoor unit 21, such as a program (or programs) for processing or controlling of the controller 170*a*.

The controller 170*a* may control overall operation of each unit (or component) of the outdoor unit 21.

The power supply 190*a* may supply a voltage necessary for operation of each component based on control by the controller 170*a*.

The compressor drive unit 200 may include a circuit for driving the compressor 170*a*.

The fan drive unit 127*a* may include a circuit for driving a fan.

The indoor unit 31 may include an input unit 110 (or input device), a memory 140*b*, a controller 170*b*, a display 180 and a power supply 190*b*.

The input unit 110 may include a plurality of buttons or a touchscreen attached to the indoor unit 31. By using the plurality of buttons or the touchscreen, the indoor unit 31 may be powered on. The input unit may perform various input operations.

The communication unit 120*b* may exchange data with the outdoor unit 21. For example, the communication unit 120*b* may exchange data with the outdoor unit 21 via wired power-line communication, for example.

The memory 140*b* may store a variety of data for overall operation of the indoor unit 31, such as a program (or programs) for processing or controlling of the controller 170*b*.

The controller 170*b* may control overall operation of each unit of the indoor unit 31.

The power supply 190*b* may supply a voltage necessary for operation of each component based on control by the controller 170*b*.

The display 180 may display an operation state of the indoor unit 31.

Figure 4:
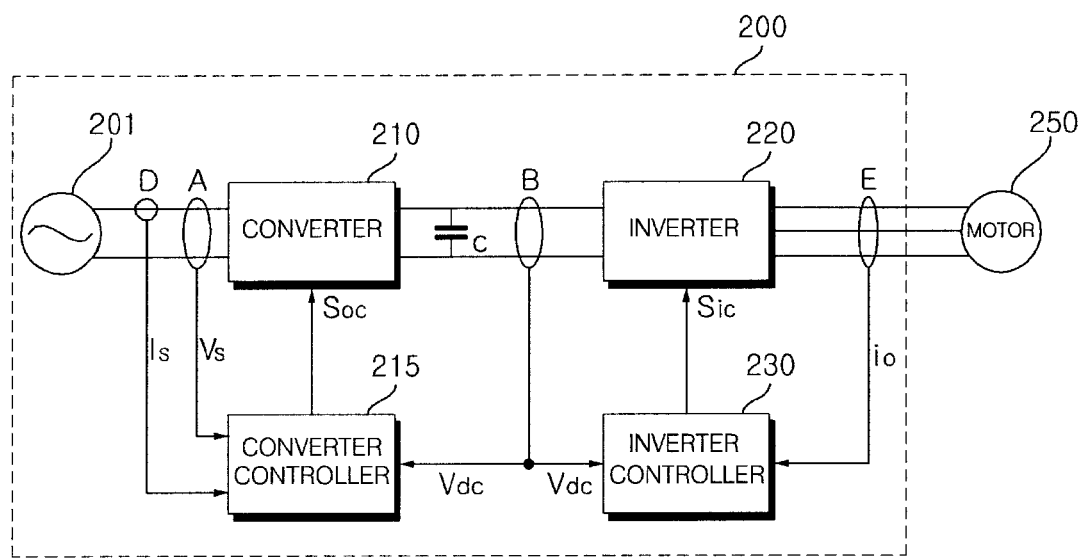
FIG. 4 is a block diagram showing a compressor drive unit to drive a compressor of the outdoor unit of FIG. 1.
Figure 5:
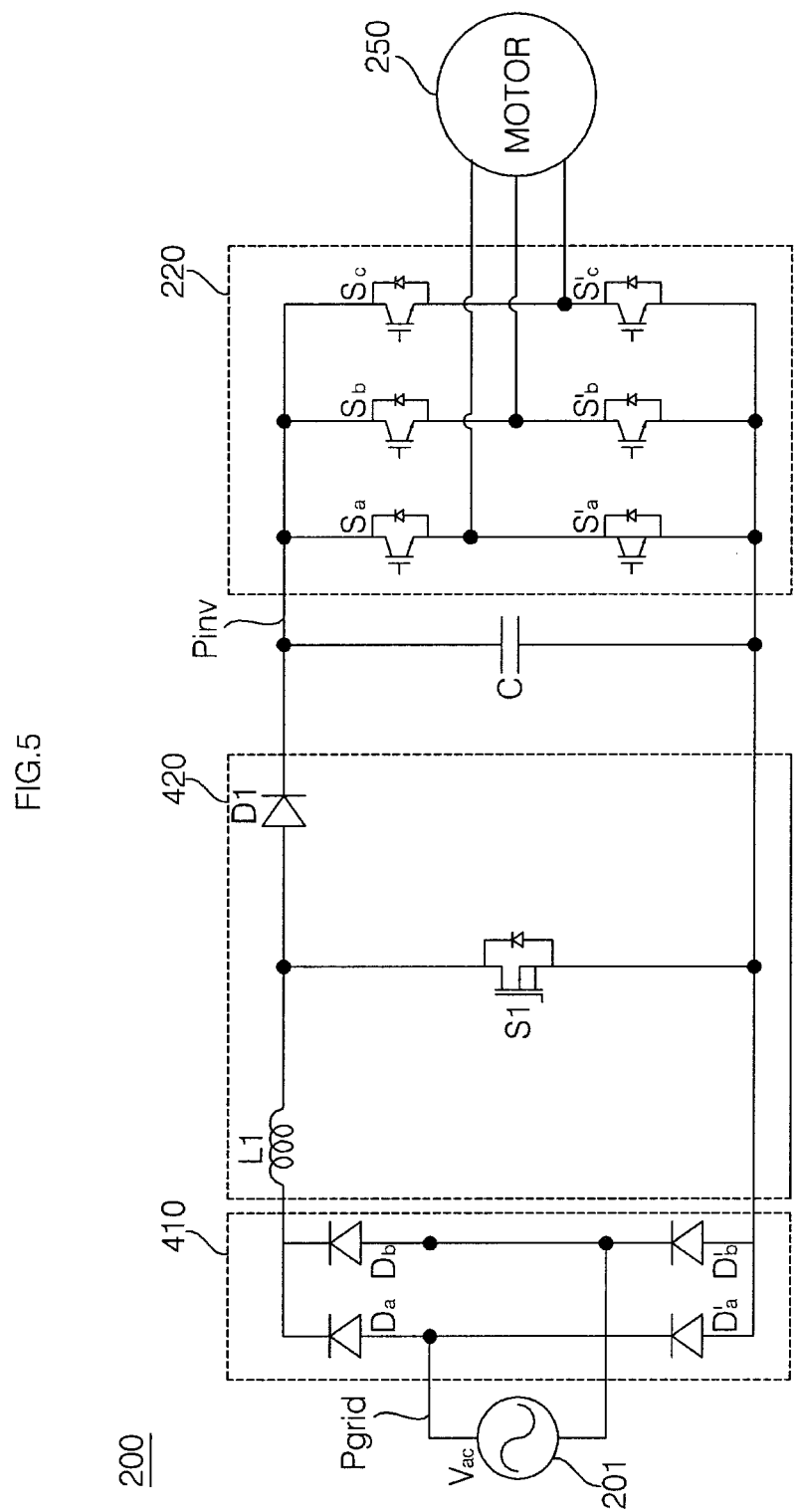
FIG. 5 is a circuit diagram showing an example of the compressor drive unit of FIG. 4.

FIG. 4 is a block diagram showing a compressor drive unit (or apparatus) for driving the compressor of the outdoor unit (FIG. 1). FIG. 5 is a circuit diagram showing an example of the compressor drive unit (or apparatus) (FIG. 4). Other embodiments and configurations may also be provided. The compressor drive unit 200 may also be called a compressor driver (or compressor driver apparatus).

The compressor drive unit 200 for driving the compressor may include an inverter 220 for outputting three-phase AC current to a compressor motor 250, an inverter controller 230 for controlling the inverter 220, a converter 210 for supplying a DC voltage to the inverter 220, a converter controller 215 for controlling the converter 210, and a DC link capacitor C between the converter 210 and the inverter 220. The compressor drive unit 200 may further include a DC link voltage detector B, an input voltage detector A, an input current detector D and an output current detector E.

The compressor drive unit 200 may convert AC power received from a power system and supply the converted power to the compressor motor 250. The compressor drive unit 200 may be referred to as a compressor drive apparatus.

The converter 210 may convert an input AC voltage into a DC voltage. The converter 210 may include a rectifier 410 and a boost converter 420, as shown in FIG. 5. Input power based on the input AC voltage may be referred to as Pgrid.

The rectifier 410 may receive and rectify a single-phase AC voltage and output a rectified voltage. The single-phase AC voltage may be from an AC voltage source 201 (or power supply).

The rectifier 410 may include two pairs of upper and lower arm diodes that are connected to each other in parallel (Da&D'a, Db&D'b), each pair including an upper arm diode element and a lower arm diode element that are connected in series. That is, the upper and lower arm diodes may be connected to each other in the form of a bridge.

The boost converter 420 may include an inductor L1 and a diode D1 connected in series between the rectifier 410 and the inverter 220 and a switching element S1 connected between the inductor L1 and the diode D1. The switching element S1 may be turned on to store energy in the inductor L1, and then the switching element S1 may be turned off to output the energy stored in the inductor L1 through the diode D1.

If a low-capacity DC link capacitor C is used, the boost converter 420 may output a voltage obtained by boosting a predetermined voltage (i.e. an offset voltage).

The converter controller 215 may control turn-on timing of the switching element S1 of the boost converter 420. Accordingly, a converter switching control signal $S_{oc}$ for controlling the turn-on timing of the switching element S1 may be output.

The converter controller 215 may receive an input voltage $V_s$, an input current $I_s$ and a DC link voltage $V_{dc}$ from the input voltage detector A, the input current detector D and the DC link voltage detector B, respectively.

The input voltage detector A may detect the input voltage $V_s$ from an input AC power source 201, and/or the input voltage detector A may be located at a previous stage of the rectifier 410.

The input voltage detector A may include a resistor element and an operational amplifier (OP AMP) for voltage detection. The detected input voltage $V_s$ may be provided to the converter controller 215 in the form of a pulse type discrete signal to generate the converter switching control signal $S_{oc}$.

The input voltage detector A may also detect a zero crossing point of the input voltage.

The input current detector D may detect the input current $I_s$ from the input AC power source 201. More specifically, the input current detector D may be provided at a previous stage of the rectifier 410.

The input current detector D may include a current sensor, a current transformer (CT), and a shunt resistor for current detection. The detected input current $I_s$ may be provided to the converter controller 215 in the form of a pulse type discrete signal to generate the converter switching control signal $S_{oc}$.

The DC voltage detector B may detect the DC link voltage $V_{dc}$ of the DC link capacitor C. A resistor element (e.g. an OP AMP) may be used to detect power. The detected voltage $V_{dc}$ of the DC link capacitor C may be provided to the converter controller 215 and the inverter controller 230 in the form of a pulse type discrete signal. The converter switching control signal $S_{oc}$ and an inverter switching control signal $S_{ic}$ may be generated based on the DC voltage $V_{dc}$ of the DC link capacitor C.

The inverter 220 may include a plurality of inverter switching elements. The inverter 220 may convert the DC voltage $V_{dc}$ smoothed by on/off operations of the switching elements into a three-phase AC voltage having a predetermined frequency and output the three-phase AC voltage to the three-phase motor 250.

The inverter 220 may supply an inverter power Pinv to the motor 250, which is considered a load. The inverter power Pinv is a power necessary for the motor 250. The inverter power may follow a necessary target power. Accordingly, the inverter power Pinv may have the same concept as a target power required for the load.

More specifically, the inverter 220 may include a plurality of switching elements. For example, the inverter 220 may include upper arm switching elements Sa, Sb, and Sc and lower arm switching elements S'a, S'b, and S'c, each pair of an upper arm switching element and a lower arm switching element being connected in series and three pairs of upper and lower arm switching elements Sa and S'a, Sb and S'b, and Sc and S'c being connected in parallel. Diodes may be connected in anti-parallel to the respective switching elements Sa, S'a, Sb, S'b, Sc, and S'c.

The inverter controller 230 may output the inverter switching control signal $S_{ic}$ to the inverter 220 so as to control a switching operation of the inverter 220. The inverter switching control signal $S_{ic}$ may be provided and output based on an output current $i_o$ flowing in the motor 250, and the DC link voltage $V_{dc}$ at both ends of the DC link capacitor, as a pulse width modulation (PWM) switching control signal. The output current $i_o$ may be detected by the output current detector E and the DC link voltage $V_{dc}$ may be detected by the DC link voltage detector B.

The output current detector E may detect the output current $i_o$ flowing between the inverter 220 and the compressor motor 250. That is, the output current detector E may detect current flowing in the motor 250. The output current detector E may detect all output currents $i_a$, $i_b$, and $i_c$ of respective phases. Alternatively, the output current detector E may detect output currents of two phases using three-phase balance.

The output current detector E may be disposed between the inverter 220 and the compressor motor 250. A current transformer (CT), a shunt resistor, etc. may be used for current detection.

The output inverter switching control signal $S_{ic}$ may be converted into a gate drive signal in a gate drive unit (or gate driver) and input to the gate of each switching element of the inverter 220. Therefore, the switching elements Sa, S'a, Sb, S'b, Sc and S'c of the inverter 220 may perform switching operation.

Figure 6:
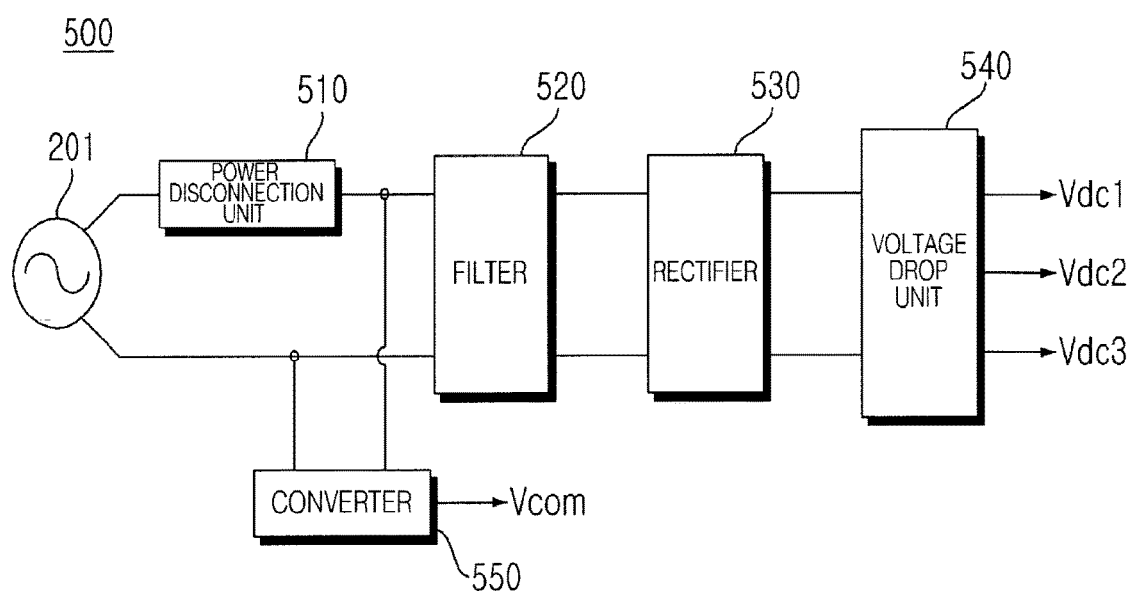
FIG. 6 is a block diagram showing a power conversion apparatus of an air conditioner.

FIG. 6 is a block diagram showing an internal configuration of a power conversion apparatus of an air conditioner. Other embodiments and configurations may also be provided.

A power conversion apparatus 500 may include a power disconnection unit 510, a filter 520, a rectifier 530, a voltage drop unit 540 (or voltage drop device) and a converter 550 for outputting a voltage $V_{com}$ to an outdoor communication unit 120a (such as of the outdoor unit 21).

The converter 550 is connected between the power disconnection unit 510 and the filter 520 to convert an AC voltage into a DC voltage and to output the converted DC voltage as the voltage $V_{com}$ to the outdoor communication unit 120a.

When operation of the air conditioner 100 is stopped, according to the circuit configuration shown in FIG. 6, since voltage conversion is performed in the converter 550, power consumption may occur. That is, standby power consumption may occur.

Even when the outdoor unit 21 does not operate and thus the voltage drop unit 540 does not operate, then standby power consumption may occur in the converter 550.

A method may be provided of stably outputting the voltage $V_{com}$ to the outdoor communication unit 120a while reducing unnecessary standby power consumption. This may be described with reference to FIG. 7 and subsequent figures.

Figure 7:
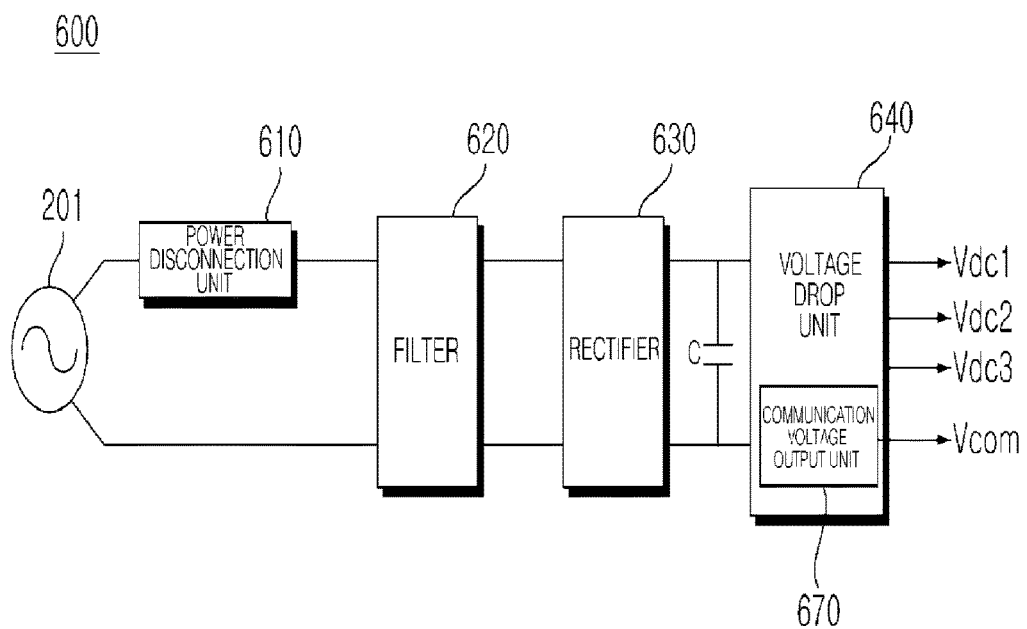
FIG. 7 is a block diagram showing a power conversion apparatus of an air conditioner according to an example embodiment.
Figure 8:
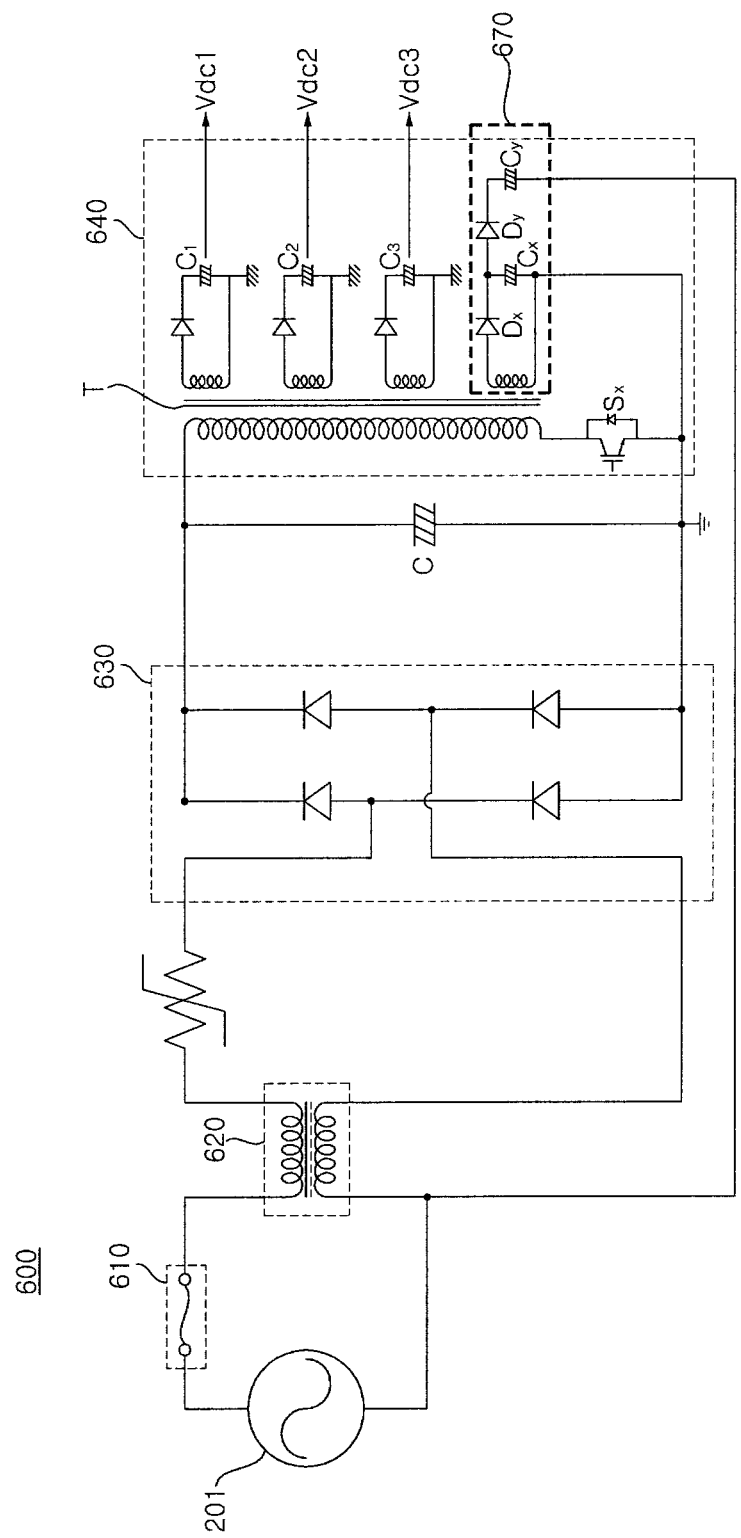
FIG. 8 is a circuit diagram of the power conversion apparatus of FIG. 7.

FIG. 7 is a block diagram showing a power conversion apparatus of an air conditioner according to an example embodiment. FIG. 8 is a circuit diagram of the power conversion apparatus of FIG. 7. Other embodiments and configurations may also be provided.

A power conversion apparatus 600 may be provided in the power supply 190a (FIG. 3).

The power conversion apparatus 600 (FIG. 7 or 8) may include a power disconnection unit 610, a filter 620, a rectifier 630 and a voltage drop unit 640 (or voltage drop device).

A communication voltage output unit 670 (or communication voltage output device) may be provided in the voltage drop unit 640.

The power disconnection unit 610 may perform power connection operation of the input AC power source 201 and may, for example include a fuse.

The filter 620 may eliminate noise of the input AC power source 201.

The rectifier 630 may rectify the voltage from the input AC power source 201 and output the rectified voltage. For example, the rectifier 630 may include a bridge diode. As shown in FIG. 8, two upper diodes and two lower diodes may be connected in the form of a bridge.

A capacitor C for smoothing the rectified voltage may be provided between the rectifier 630 and the voltage drop unit 640.

The voltage drop unit 640 may output the dropped voltage using the voltage from the rectifier. A plurality of DC voltages $V_{dc1}$, $V_{dc2}$, $V_{dc3}$ and $V_{com}$ may be output from the voltage drop unit 640.

The plurality of DC voltages $V_{dc1}$, $V_{dc2}$, $V_{dc3}$ and $V_{com}$ may be supplied to the respective units (or components) of the outdoor unit 21.

The voltage drop unit 640 may output the voltage $V_{com}$ to the outdoor communication unit 120a.

The voltage drop unit 640 may include a communication voltage output unit 670 (or communication voltage output device) for outputting the voltage $V_{com}$ to the outdoor communication unit 120a.

The voltage drop unit 640 (or voltage drop device) may include a transformer T and a flyback converter including a switching element $S_x$ connected to a primary side of the transformer T.

The communication voltage output unit 670 (or communication voltage output device) may be provided at a secondary side of the transformer T.

The communication voltage output unit 670 may include a first diode $D_x$ having an anode connected to one end of the secondary side of the transformer T, a first capacitor $C_x$ connected between a cathode of the first diode $D_x$ and ground, a second diode $D_y$ having an anode connected to the cathode of the first diode $D_x$, and a second capacitor $C_y$ connected between a cathode of the second diode $D_y$ and one end of the input AC power source 201.

The power conversation apparatus 600 (FIG. 7 or 8) may further include the inverter 220 and the compressor motor 250 (FIG. 4), which are disposed between the rectifier 630 and the voltage drop unit 640. The inverter controller 230 (FIG. 4) may be further included.

That is, the power conversion apparatus 600 may further include an inverter 220 connected across the capacitor C and connected in parallel to the voltage drop unit 640.

The power conversion apparatus 600 may further include a DC link voltage detector B for detecting a voltage across the capacitor C, an output current detector E for detecting current flowing between the motor and the inverter 220 and an inverter controller 230 for controlling the inverter 220 based on the DC link voltage or output current, for control of the inverter 220.

The motor may be a compressor motor or an outdoor fan motor.

Figure 9:
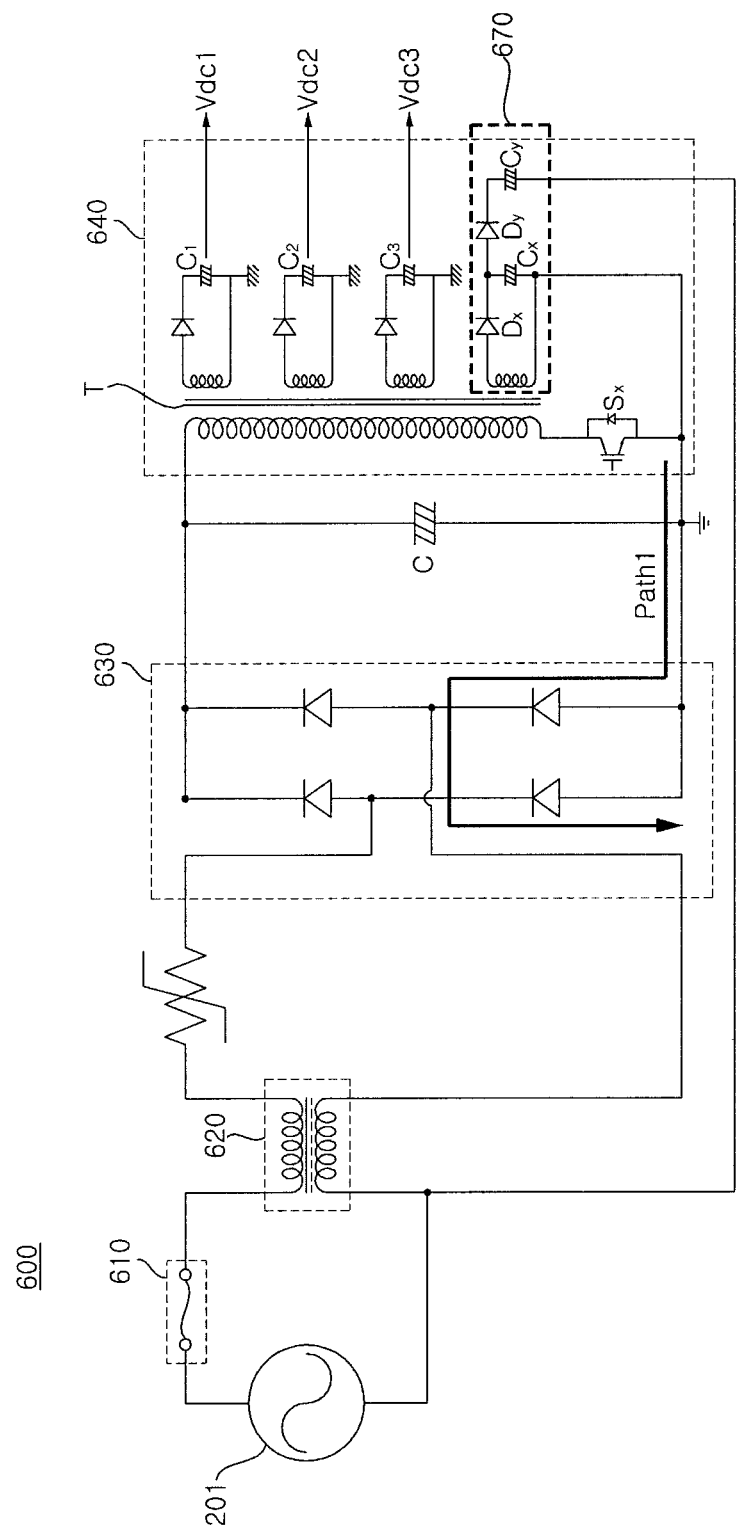
FIG. 9 is a diagram illustrating operation of the power conversion apparatus of FIG. 8.

FIG. 9 is a diagram illustrating operation of the power conversion apparatus of FIG. 8. Other embodiments and configurations may also be provided.

A first capacitor $C_x$ may store a first DC voltage $V_{com}$ based on operation of the transformer T. When the lower diode of the rectifier 630 is conducted, the first DC voltage $V_{com}$ stored in the first capacitor $C_x$ may be stored in the second capacitor $C_y$.

The communication voltage output unit 670 may output the first DC voltage $V_{com}$ stored in the second capacitor $C_y$ as the voltage $V_{com}$ to the outdoor communication unit 120a (such as of the outdoor unit 21).

Thereafter, the first DC voltage $V_{com}$ stored in the second capacitor $C_y$ may be output as an independent power source separately from operation of the voltage drop unit 640, and more particularly, the transformer T. Accordingly, noise generated by the voltage drop unit 640 may be eliminated (or substantially reduced).

Since the communication voltage output unit 670 is provided at the secondary side of the transformer T, when the transformer T does not operate (i.e., when the switching element $S_x$ does not operate), the communication voltage output unit 670 (or communication voltage output device) cannot output a voltage. Accordingly, standby power consumption does not occur.

When the outdoor unit operates to turn on the switching element $S_x$, the first capacitor $C_x$ stores the first DC voltage $V_{com}$ based on operation of the transformer T, and when the lower diode of the rectifier 630 is conducted, the first DC voltage $V_{com}$ stored in the first capacitor $C_x$ may be stored in the second capacitor $C_y$.

As a result, according to the power conversion apparatus 600 (FIG. 7 or FIG. 8), it is possible to stably supply the voltage to the communication unit (or communication device) while standby power is reduced.

According to at least one embodiment, the power conversion apparatus and the air conditioner including the same may include a rectifier to rectify a voltage of an input alternating current (AC) power source and a voltage drop unit (or voltage drop device) to output a dropped voltage using voltage from the rectifier. The voltage drop unit may include a transformer and a communication voltage output unit provided at a secondary side of the transformer to output a direct current (DC) voltage for operation of the communication unit. Accordingly, it may be possible to stably supply a voltage to a communication unit while reducing standby power.

The first DC voltage may be stored based on operation of the transformer, and the first DC voltage stored in the first capacitor may be stored in the second capacitor when the lower diode of the rectifier is conducted, thereby outputting the first DC voltage stored in the second capacitor as an independent power source separately from the voltage drop unit. Accordingly, noise generated by the voltage drop unit may be eliminated (or substantially reduced).

The power conversion apparatus and the air conditioner including the same may not be limited to configurations and methods of the above-described embodiments, and all or some of the embodiments may be selectively combined with one another to achieve various alterations.

The method of operating the power conversion apparatus or the air conditioner may be implemented as code that can be written to a processor-readable recording medium (or controller-readable medium) and can thus be read by a processor (or controller). The processor-readable recording medium may be any type of recording device in which data can be stored in a processor-readable manner. Examples of the processor-readable recording medium include a ROM, a RAM, a CD-ROM, a magnetic tape, a floppy disk, optical data storage, and a carrier wave (e.g., data transmission over the Internet). The computer-readable recording medium may be distributed over a plurality of computer systems connected to a network so that processor-readable code is written thereto and executed therefrom in a decentralized manner. Functional programs, code, and code segments to realize the embodiments herein can be construed by one of ordinary skill in the art.

Embodiments have been made in view of the above problems, and it is an object to provide a power conversion apparatus capable of stably supplying a voltage to a communication unit while reducing standby power, and an air conditioner including the same.

In accordance with an aspect of at least one embodiment, the above and other objects can be accomplished by a power conversion apparatus including a rectifier to rectify a voltage of an input alternating current (AC) power source and a voltage drop unit to output a dropped voltage using the voltage from the rectifier. The voltage drop unit may include a transformer and a communication voltage output unit provided at a secondary side of the transformer to output a direct current (DC) voltage for operation of the communication unit.

According to an aspect of at least one embodiment, an air conditioner may be provided that includes a compressor, a compressor drive unit to drive the compressor, a communication unit to exchange data with an indoor unit, a rectifier to rectify a voltage of an input alternating current (AC) power source, and a voltage drop unit to output a dropped voltage using the voltage from the rectifier. The voltage drop unit may include a transformer and a communication voltage output unit provided at a secondary side of the transformer to output a direct current (DC) voltage for operation of the communication unit.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A power conversion apparatus comprising:
   a rectifier to rectify a voltage of an input alternating current (AC) power source; and
   a voltage drop device to output a voltage based on voltage from the rectifier, wherein the voltage drop device includes:
   a transformer having a primary side and a secondary side; and
   a communication voltage output device, provided at the secondary side of the transformer, to output a direct current (DC) voltage for operation of a communication device,
   wherein the communication voltage output device includes:
   a first diode having an anode to couple to one end of the secondary side of the transformer;
   a first capacitor to couple between a cathode of the first diode and ground;
   a second diode having an anode to couple to the cathode of the first diode; and
   a second capacitor to couple between a cathode of the second diode and one end of the input AC power source.

2. The power conversion apparatus according to claim 1, wherein:
   the first capacitor to store a first DC voltage based on operation of the transformer, and
   when a lower diode of the rectifier is conducted, the first DC voltage in the first capacitor is to be stored in the second capacitor of the communication voltage output device.

3. The power conversion apparatus according to claim 1, further comprising:
   a power disconnection device to perform a power disconnection operation between the input AC power source and the rectifier; and
   a capacitor between the rectifier and the voltage drop device.

4. The power conversion apparatus according to claim 1, wherein the voltage drop device includes a flyback converter including the transformer and a switching element to couple to the primary side of the transformer.

5. The power conversion apparatus according to claim 1, further comprising:
   a capacitor between the rectifier and the voltage drop device; and
   an inverter to couple across the capacitor, and the inverter to couple in parallel to the voltage drop device to drive a motor.

6. The power conversion apparatus according to claim 5, further comprising:
   a DC link voltage detector to detect a voltage across the capacitor;
   an output current detector to detect an output current between the motor and the inverter; and
   an inverter controller to control the inverter based on the detected output current.

7. An air conditioner comprising:
   a compressor;
   a compressor drive device to drive the compressor;
   a communication device to exchange data with another unit of the air conditioner;
   a rectifier to rectify a voltage of an input alternating current (AC) power source; and
   a voltage drop device to output a voltage based on voltage from the rectifier, wherein the voltage drop device includes:
   a transformer having a primary side and a secondary side; and
   a communication voltage output device provided at the secondary side of the transformer, to output a direct current (DC) voltage for operation of the communication device,
   wherein the communication voltage output device includes:
   a first diode having an anode to couple to one end of the secondary side of the transformer;
   a first capacitor to couple between a cathode of the first diode and ground;
   a second diode having an anode to couple to the cathode of the first diode; and
   a second capacitor to couple between a cathode of the second diode and one end of the input AC power source.

8. The air conditioner according to claim 7, wherein:
   the first capacitor to store a first DC voltage based operation of the transformer, and
   when a lower diode of the rectifier is conducted, the first DC voltage in the first capacitor is to be stored in the second capacitor of the communication voltage output device.

9. The air conditioner according to claim 7, further comprising:

a power disconnection device to perform a power disconnection operation between the input AC power source and the rectifier; and a capacitor between the rectifier and the voltage drop device.

10. The air conditioner according to claim 7, wherein the voltage drop device includes a flyback converter including the transformer and a switching element coupled to the primary side of the transformer.

11. The air conditioner according to claim 7, further comprising:

a capacitor between the rectifier and the voltage drop device; and an inverter to couple across the capacitor, and the inverter to couple in parallel to the voltage drop device to drive a motor.

12. The air conditioner according to claim 11, further comprising:

a DC link voltage detector to detect a voltage across the capacitor;

an output current detector to detect an output current flowing between the motor and the inverter; and an inverter controller to control the inverter based on the detected output current.

13. A power conversion apparatus comprising:

a rectifier to rectify a voltage of an input alternating current (AC) power source;

a transformer having a primary side and a secondary side, the primary side of the transformer to receive voltage from the rectifier; and a communication voltage output device, provided at the secondary side of the transformer, to output a direct current (DC) voltage for operation of a communication device, wherein the communication voltage output device includes a first capacitor and a second capacitor, the first capacitor to store a DC voltage based on operation of the transformer, and when a part of the rectifier is conducted, the DC voltage to be stored in the second capacitor, wherein the communication voltage output device includes:

a first diode having an anode to couple to one end of the secondary side of the transformer;

the first capacitor to couple between a cathode of the first diode and ground;

a second diode having an anode to couple to the cathode of the first diode; and the second capacitor to couple between a cathode of the second diode and one end of the input AC power source.

14. The power conversion apparatus according to claim 13, further comprising:

a power disconnection device to perform a power disconnection operation between the input AC power source and the rectifier; and a third capacitor between the rectifier and the transformer.

15. The power conversion apparatus according to claim 13, further comprising:

a third capacitor between the rectifier and the transformer; and an inverter to couple across the third capacitor, and to drive a motor.

16. The power conversion apparatus according to claim 15, further comprising:

a DC link voltage detector to detect a voltage across the third capacitor;

an output current detector to detect an output current between the motor and the inverter; and an inverter controller to control the inverter based on the detected output current.

17. An air conditioner comprising:

a compressor;

a compressor drive device to drive the compressor;

the communication device to exchange data with another unit of the air conditioner; and the power conversion apparatus according to claim 13.

* * * * *